United States Patent [19]
Bousaid et al.

[11] 4,271,906
[45] Jun. 9, 1981

[54] OIL RECOVERY METHOD EMPLOYING ALTERNATE SLUGS OF SURFACTANT AND FRESH WATER SOLUTION OF SACRIFICIAL AGENT

[75] Inventors: Issam S. Bousaid; Benny K-C Ho, both of Houston, Tex.

[73] Assignee: Texaco Inc., White Plains, N.Y.

[21] Appl. No.: 71,147

[22] Filed: Aug. 30, 1979

[51] Int. Cl.³ ............................................. E21B 43/22
[52] U.S. Cl. ...................................... 166/273; 166/274
[58] Field of Search ............ 166/273, 274, 275, 305 R

[56] References Cited
U.S. PATENT DOCUMENTS

| | | | |
|---|---|---|---|
| 3,346,047 | 10/1967 | Townsend et al. | 166/273 |
| 3,421,582 | 1/1969 | Fallgatter | 166/273 |
| 3,437,141 | 4/1969 | Brandner et al. | 166/273 |
| 3,500,920 | 3/1970 | Raifsnider | 166/273 |
| 3,500,922 | 3/1970 | O'Brien et al. | 166/273 |
| 3,612,182 | 10/1971 | Raifsnider | 166/273 X |
| 4,043,396 | 8/1977 | Kudchadker et al. | 166/274 |
| 4,133,385 | 1/1979 | Kalfoglou | 166/273 |
| 4,157,115 | 6/1979 | Kalfoglou | 166/274 |
| 4,172,498 | 10/1979 | Kalfoglou | 166/273 |

*Primary Examiner*—James A. Leppink
*Assistant Examiner*—George A. Suchfield

*Attorney, Agent, or Firm*—Carl G. Ries; Robert A. Kulason; Jack H. Park

[57] ABSTRACT

Disclosed is a petroleum recovery method useful for recovering petroleum from subterranean formations containing water having high salinity and/or divalent ion concentration, employing an aqueous surfactant-containing fluid which is designed to effect low surface tension displacement of petroleum in the formation in the presence of high salinity water. The improvement comprises injecting the total desired volume of surfactant in the form of a plurality of relatively small slugs of surfactant fluid, and alternatingly injecting similarly small pore volume slugs of fluid comprising fresh water, e.g. salinities less than 10,000 parts per million and preferably less than 1000 parts per million total dissolved solids, and having dissolved or dispersed therein an effective amount of a sacrificial agent such as a water soluble lignosulfonate salt. The total pore volume of surfactant-containing fluid injected is ordinarily from 0.01 to 1.00 and preferably from 0.20 to 0.50 pore volumes. This total amount of surfactant fluid is injected in from 2 to 15 and preferably from 3 to 6 separate discrete slugs. Each slug of surfactant fluid is followed by injecting a quantity of fresh water containing the sacrificial agent. The volume of each fresh water sacrificial agent slug is ordinarily from 0.5 to 5.0 and preferably 1 to 2 times the volume of the preceding surfactant fluid slug.

33 Claims, No Drawings

OIL RECOVERY METHOD EMPLOYING ALTERNATE SLUGS OF SURFACTANT AND FRESH WATER SOLUTION OF SACRIFICIAL AGENT

FIELD OF THE INVENTION

This invention concerns a surfactant waterflooding petroleum recovery process.

BACKGROUND OF THE INVENTION

Petroleum is found in subterranean formations or reservoirs in which it has accumulated, and recovery is initially accomplished by pumping or permitting the petroleum to flow to the surface of the earth through wells drilled into and in fluid communication with the subterranean reservoirs. Petroleum can be recovered from the subterranean formations only if certain conditions exist. There must be an adequately high concentration of petroleum in the formation, and there must be adequate permeability or interconnected flow channel throughout the formation to permit the flow of fluid therethrough if sufficient pressure is applied to the fluid. When the subterranean, petroleum-containing formation has natural energy present in the form of an active, underlying or edge water drive, solution gas, or a high pressure gas cap above the petroleum within the reservoir, the natural energy is utilized to recovery petroleum in what is commonly referred to as primary recovery. In this primary phase of petroleum recovery, petroleum flows to wells drilled into and completed in the formation, the petroleum being displaced through the formation toward the wells by the naturally occurring energy in the reservoir. When the natural energy source is depleted, or in the instance of those formations which do not originally contain sufficient natural energy to permit primary recovery operations, some form of supplemental recovery process must be applied to the reservoir. Supplemental recovery is frequently referred to as secondary or tertiary recovery, although in fact it may be primary, secondary or tertiary in sequence of employment. Petroleum recovery operations involving the injection of water into the formation for the purpose of displacing petroleum toward the production well, commonly referred to as waterflooding, is the most economical and widely practiced form of supplemental recovery. Water does not displace petroleum with high efficiency, however, since water and oil are immiscible and the interfacial tension between water and oil is quite high. Persons skilled in the art of oil recovery have recognized this limitation of waterflooding and many additives have been described in the literature for incorporating in the flood water for the purpose of decreasing the interfacial tension between the injection water and the formation petroleum. For example, petroleum sulfonates have been disclosed in many references for use in oil recovery operations, but petroleum sulfonates have limitations with respect to formation water salinity, hardness and other factors which frequently restrict their usefulness. U.S. Pat. No. 3,811,504 describes a three component surfactant system comprising an anionic surfactant such as an alkyl or alkylaryl sulfonate, a nonionic surfactant such as a polyethoxylated alkylphenol, and an alkylpolyethoxy sulfate. U.S. Pat. No. 3,811,505 describes a dual surfactant system employing an anionic surfactant such as an alkyl or alkylaryl sulfonate or phosphate, plus a nonionic surfactant such as polyethoxylated alkylphenol or polyethoxylated aliphatic alcohol. These systems permit the use of a surfactant flooding process in formations containing from 500 to 12,000 parts per million polyvalent ions such as calcium and magnesium. The foregoing process employing nonionic surfactants such as ethoxylated and sulfated surfactants are effective at high salinities, but have a limited temperature tolerance range. Surfactant waterflooding processes employing alkylpolyalkoxyalkylene sulfonates or alkylarylpolyalkoxyalkylene sulfonates are described in U.S. Pat. Nos. 3,827,497; 3,890,239; and 4,018,278. These surfactant mixtures are especially suitable for use in surfactant waterflood operations being applied to formations whose temperatures exceed the useful limits of nonionic surfactants and polyethoxylated and sulfated surfactants, and are additionally effective for use in formations containing very high salinity formation water.

While the foregoing described surfactant waterflood oil recovery processes have produced various encouraging results in laboratory experiments, field application of these processes have generally been less successful than expected, and the amount of additional oil recovered has thus far been insufficient to justify the cost of the surfactant materials incorporated in the flood water. A substantial cause for the disappointing results obtained in field application of surfactant waterflood oil recovery processes described in the literature are believed to be the loss of surfactant from the aqueous surfactant fluid to the formation as the fluid passes through the flow channels of the formation. This loss of surfactant is at least in part related to the adsorption of the surface active agents from the aqueous fluid onto the mineral surface of the formation matrix. It is also believed that some loss of surfactant to the formation occurs as a consequence of surfactant fluid entering dead-end flow channels of the formation, and remaining trapped in those flow channels and unavailable for subsequent low surface tension displacement of petroleum as the fluids are displaced through the formation by the drive water.

The use of many additives has been described in the literature for the purpose of decreasing the amount of surfactant adsorbed by the formation, including water soluble salts of carbonates, phosphates, fluorides, as well as quaternary ammonium salts. Unfortunately, many of the most effective sacrificial agents cannot be employed in processes being applied to formations containing water having dissolved therein relatively high concentrations of divalent ions such as calcium and magnesium because of the precipitation of insoluble calcium or magnesium salts which occurs when the injected chemicals contact the hard formation water. In formations containing high concentrations of divalent ions, water soluble lignosulfonate salts and related compounds can be used to reduce adsorption of surfactant, but they are expensive and not entirely satisfactory for preventing loss of surfactant in the formation from the surfactant-containing fluid.

In view of the foregoing discussion, it can be appreciated that there is a significant unsatisfied commercial need for a surfactant waterflooding oil recovery method, especially one employing the synthetic surfactants which can be used in formations containing high salinity, hard water, without experiencing significant loss of surfactant from the surfactant-containing fluid to the formation mineral matrix. More particularly, there is a significant commercial need for a method of conducting a surfactant waterflooding oil recovery process in which the amount of additional oil recovered as a consequence of injecting the surfactant-containing fluid, is sufficient to justify the high cost of the surfactant waterflooding oil recovery process.

BRIEF DESCRIPTION OF THE PRIOR ART

U.S. Pat. No. 3,882,940 describes a tertiary oil recovery process in which a single slug of surfactant-containing oil recovery fluid is injected followed by alternating cycles of injecting slugs of gas and slugs of water.

U.S. Pat. No. 3,434,542 describes the use of a single slug of surfactant fluid followed by a single slug of polymer fluid in which the concentration of polymer is tapered or constantly deminished.

U.S. Pat. No. 3,421,582 describes an oil recovery method in which a first slug comprising surfactant dissolved in oil or water is injected followed by a second slug comprising surfactant dissolved in thickened water.

U.S. Pat. No. 3,915,230 describes an oil recovery process in which a controlled salinity thickened aqueous slug is injected and followed by an aqueous surfactant slug.

SUMMARY OF THE INVENTION

The present invention concerns a surfactant waterflooding oil recovery process, particularly one employing a surfactant tolerant of relatively high concentrations of salinity and/or divalent ions in the formation water. Surfactants of the class suitable for use in this process include nonionic surfactants such as polyethoxylated alkanols and polyethoxylated alkylphenols. Another class of surfactant especially suitable for use in this invention includes alkylpolyethoxy sulfate or alkylarylpolyethoxy sulfate, which are effective at salinity levels substantially greater than the above-described nonionic surfactant, so long as the formation temperature is less than about 160° F. Another especially preferred class of surfactant for use in the process of this invention include alkylpolyalkoxyalkylene sulfonates or alkylarylpolyalkoxyalkylene sulfonates, which are suitable for use in formations containing up to 240,000 parts per million total dissolved solids in the formation water, in formations whose temperatures are as high as 240° F. The foregoing surfactants may be used as substantially the only surfactant present in the surfactant fluid, or may be used in combination with an organic sulfonate surfactant such as petroleum sulfonate, alkyl sulfonate, or alkylaryl sulfonate. The use of these surfactants is generally described in numerous prior art references.

In applying the particular process of this invention, the total amount of surfactant-containing fluid to be injected into the formation is injected in the form of a plurality of separate, discrete slugs of surfactant fluid, alternatingly injecting similarly small slugs of fluids comprising fresh water, e.g. salinities less than 10,000 parts per million and preferably less than 1000 parts per million total dissolved solids, and having dissolved or dispersed therein an effective amount of a sacrificial agent such as a water soluble lignosulfonate salt. Ordinarily from 2 to 15 and preferably from 3 to 6 separate slugs of surfactant are injected into the formation, the total volume of surfactant being from 0.01 to 1.00 and preferably from 0.20 to 0.50 pore volumes based on the pore volume of formation to be affected by the injected fluid. The number of slugs of the fresh water sacrificial agent fluid injected alternatingly with the slugs of surfactant fluid will ordinarily be about the same as the number of surfactant slugs. The volume of each slug of fresh water solution of sacrificial agent is ordinarily from 0.5 to 5 and preferably from 1 to 2 times the volume of the immediately preceding surfactant slug. It is frequently convenient to make each succeeding slug of surfactant and each slug of fresh water solution of sacrificial agent about the same, although this is not essential. If the surfactant fluid contains a surfactant or mixture of surfactant selected or blended to achieve optimum performance at about the same salinity as the water present in the formation, then the salinity of the surfactant fluid will ordinarily be from 50 to 100 and preferably from 80 to 100 percent of the salinity of the water present in the formation. After all of the slugs of surfactant fluid and slugs of fresh, aqueous sacrificial agent-containing fluid are injected into the formation, a quantity of water containing a viscosifying amount of a hydrophilic polymer or other material capable of increasing the viscosity of the fluid is injected immediately after the surfactant fluid to achieve a favorable mobility ratio which insures more efficient displacement of the surfactant fluid. This in turn is followed by injecting a quantity of drive water or brine sufficient to displace all of the injected fluids through the formation.

DETAILED DESCRIPTION OF THE INVENTION

Surfactant waterflooding oil recovery processes as have been described in many prior art references, generally involve injecting a single quantity of surfactant fluid into the formation. Whatever surfactant is utilized, this fluid is followed by injecting water or an aqueous mobility-controlling fluid comprising water having dissolved therein a viscosifying amount of material such as a hydrophilic polymer, in order to insure favorable mobility ratio between the surfactant and subsequently-injected fluids necessary to achieve efficient sweep of the portion of the formation between the injection and production wells. As the injected surfactant-containing fluid passes through the flow channels of the formation, it displaces oil which is not displaced by waterflooding because of the presence of the interfacial tension-reducing chemical in the fluid, which accomplishes displacement of petroleum from flow channels of the formation not depleted by waterflooding. Unfortunately, the surfactant fluid remains in the formation for very long periods of time, and retention of surfactant by the formation mineral matrix is a problem which apparently affects virtually all surfactant waterflooding oil recovery processes. Moreover, the processes designed for use in formations containing water whose salinity exceeds about 20,000 parts per million total dissolved solids employ relatively expensive synthetic surfactants which are effective for low surface tension oil recovery purposes at the salinity of the formation water, and these surfactants are adsorbed even more readily from the high salinity surfactant-containing fluid than are the simple organic sulfonates used in formations containing low salinity water.

We have discovered that surfactant losses can be reduced significantly in surfactant waterflooding processes being applied to formations containing water whose salinity exceeds 20,000 parts per million total dissolved solids if the surfactant is injected in the form of a plurality of relatively small slugs of surfactant fluid, with a similarly small slug of fluids comprising fresh water, e.g. salinities less than 10,000 parts per million and preferably less than 1000 parts per million total dissolved solids, and having dissolved or dispersed therein an effective amount of a sacrificial agent such as a water soluble lignosulfonate salt injected between succeeding slugs of surfactant fluid. The amount of oil recovered from a portion of formation contacted by a surfactant fluid is increased significantly by following the process of this invention, as compared to a conventional surfactant waterflood oil recovery process employing essentially the same surfactant in the same concentration and using the same total amount of the surfactant fluid, except that the surfactant fluid is injected in the form of a single, large slug of surfactant fluid rather than the plurality of small slugs with alternating injection of fresh, aqueous sacrificial agent-containing fluid according to our process.

It is believed that there are two possible mechanisms, one or both of which may be responsible for the favorable results obtained by application of the process of our invention. One is based on the significantly lower ionic forces at the lower salinity fluid and lower divalent ions between the entrapped oil droplets and its environment, such as the matrix and fluids. By cyclically reducing the ionic forces within the flow channels, oil-water emulsions become free to move under the influence of injected fluids, and also some of the surfactant becomes available for subsequent use downstream from the injection well. The second possible explanation for the improvement relates to the resolubilization of surfactant which has been entrapped or adsorped, either chemically or chemisorbed, because of the lower ionic forces at the lower water salinity and low divalent ion concentration present in the portion of the formation each time it is contacted by the low salinity fluid being injected sequentially between slugs of saline surfactant fluid. It is entirely possible that either of these mechanisms, or both, operate simultaneously to affect the observed increase in tertiary oil recovery by application of this process.

In applying the process of our invention, the total volume of surfactant fluid to be used will ordinarily be from 0.01 to 1.0 and preferably from about 0.20 to 0.50 pore volumes based on the pore volume of the portion of the formation to be contacted by the injected fluid. The number of slugs of surfactant used is from 2 to 15 and preferably from 3 to 6. The volume of each slug should be at least 5 percent and preferably at least 10 percent of the total volume of surfactant fluid used. The pore volume of each surfactant slug will be from 0.01 to 0.50 pore volumes and preferably from 0.05 to 0.2. The volume of each fresh water, aqueous sacrificial agent-containing fluid slug will be from 0.01 to 1.0 and preferably from 0.05 to 0.5 pore volumes. As used throughout this application, pore volumes is based on the pore volume of the formation within the recovery zone defined by the injection and production wells.

If this process is to be applied to a formation containing relatively high salinity formation water, and/or water containing relatively high concentrations of divalent ions, the surfactant fluid will ordinarily contain one or more of the following surfactants.

(1) In application to formations whose temperature is less than about 125° F., nonionic surfactants may be employed advantageously and they are somewhat less expensive than the more complex surfactants to be described below. Examples of suitable nonionic surfactants for use in this embodiment of the process of our invention are listed below.

(a) polyethoxylated alkanols or alkylphenols having the following formula:

$$RO(CH_2CH_2O)_xH$$

wherein R is an alkyl having from 5 to 20 and preferably from 8 to 16 carbon atoms, or an alkylaryl such as a benzene or toluene having attached thereto at least one alkyl chain, linear or branched, containing from 5 to 18 and preferably from 6 to 14 carbon atoms, and x is from 4 to 20 and preferably 6 to 16.

(b) Dipolyethoxylated amines having the following formula:

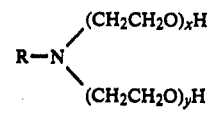

wherein R is an alkyl, linear or branched containing from 6 to 25 and preferably from 8 to 20 carbon atoms, or an alkylaryl such as benzene or toluene having attached thereto at least one alkyl group containing from 6 to 25 and preferably 8 to 20 carbon atoms, N is nitrogen, x and y are each 1 to 12 and the sum of x and y is from 2 to 24.

(c) A dipolyethoxylated alkyl catacol having the following formula:

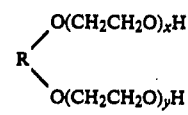

wherein R is benzene or benzene having attached thereto a linear or branched alkyl having from 6 to 25 and preferably 8 to 20 carbon atoms, x and y are each 1 to 12 and the sum of x and y is from 2 to 24.

(2) A class of surfactants suitable for use in formations whose temperature is no greater than about 160° F., but which are effective in formations containing relatively high salinity water, i.e., water whose salinity is as high as 240,000 parts per million total dissolved solids, is an alkylpolyethoxy sulfate or alkylarylpolyethoxy sulfate having the following formula:

$$RO(CH_2CH_2O)_xSO_3M$$

wherein R is an alkyl or alkylaryl having from 6 to 24 and preferably from 8 to 18 carbon atoms in the alkyl chain, x is a number from 2 to 18 and preferably from 2 to 8, and M is a monovalent cation including sodium, potassium, lithium, or ammonium. The foregoing polyethoxy sulfate surfactant is quite effective in high salinity formations including hard brine formations, e.g. formations containing water whose salinity is as high as 240,000 parts per million total dissolved solids which may include as high as 10,000 parts per million divalent ions such as calcium and magnesium; however, this surfactant is prone to hydrolysis at elevated temperatures and so should not be used if the formation's temperature exceeds about 160° F.

(3) An especially preferred surfactant for high temperature, high salinity formations, is an alkylpolyalkoxyalkylene sulfonate or alkylarylpolyalkoxyalkylene sulfonate having the following formula:

$$RO(R'O)_xR''SO_3M$$

wherein R is an alkyl, linear or branched, having from 6 to 24 and preferably from 12 to 20 carbon atoms, or an alkylaryl such as benzene or toluene having attached thereto at least one alkyl group, linear or branched, and containing from 6 to 20 and preferably 6 to 16 carbon atoms, R' is ethylene or a mixture of ethylene and higher alkylene such as propylene with relatively more ethylene than higher alkylene, x is a number including fractional numbers from 2 to 18 and preferably from 2 to 8, R" is ethylene, propylene, hydroxypropylene, or butylene and M is a monovalent ion, preferably sodium, potassium, lithium or ammonium.

Any of the foregoing surfactants may be employed as substantially the only surfactant present in the surfactant fluid used in the process of this invention, or they may be used in combination with other surfactants. For example, the use of primary anionic surfactants, usually organic sulfonates such as petroleum sulfonates, alkyl sulfonates or alkylaryl sulfonates in combination with any of the above described more soluble synthetic surfactants, is a cost effective method for conducting surfactant waterflooding operations in a high salinity formation. Organic sulfonates are particularly effective and the preferred organic sulfonates for use in the process of this invention are those which are at least partially water soluble, preferably being comprised in species of varying equivalent weight over a relatively broad range and having an average equivalent weight in the range of about 350 to about 450. Alkyl or alkylaryl sulfonates having from 6 to 20 and preferably from 8 to 18 carbon atoms in the alkyl chains may also be employed. Ordinarily the water soluble sodium, potassium, lithium or ammonium salt of the above described organic sulfonate are utilized.

The concentration of the synthetic surfactants described above will ordinarily be in the range of from about 0.10 to 10.0 and preferably from about 0.5 to 3.0 percent by weight. In the instance of using a combination of surfactants such as is described in the foregoing paragraph, the concentration of the primary anionic organic sulfonate surfactant will be from 0.1 to 10.0 and preferably from 1.0 to 5.0 percent by weight. It is customary to maintain the ratio of primary anionic organic sulfonate surfactant to the solubilizing surfactant in the range of 0.1 to 10.0 and preferably from 0.2 to 3.0.

The total pore volume of surfactant solution employed in the process of this invention is approximately the same as is used in conventional processes described in the literature and are generally in the range of from 0.01 to 1.0 and preferably from 0.20 to 0.50 pore volumes. Similarly, it is customary in state-of-the-art surfactant waterflooding processes to follow the surfactant solution with a mobility-controlling fluid comprising water having dispersed or dissolved therein a sufficient amount of a viscosifying material to increase the viscosity of the fluid so as to insure a favorable mobility ratio between that fluid and the previously-injected surfactant fluid. Ordinarily from about 100 to about 2,000 and preferably from about 500 to 1500 parts per million hydrophilic polymers such as partially hydrolyzed polyacrylamides, copolymers of acrylamide and acrylic acid, as well as biopolymers such as polysaccharides which are commercially available for this purpose, achieve the desired favorable mobility ratio between the mobility fluid and the previously injected surfactant fluid. From 0.1 to 1.0 and preferably 0.20 to 0.50 pore volumes of mobility-controlling fluid is ordinarily employed and should be employed in a preferred embodiment of this process. The mobility-controlling fluid is injected immediately after all of the slugs of surfactant and fresh water solution of sacrificial agent have been injected. Field brine is injected next to displace mobilized oil and the previously injected fluids through the formation.

In applying the process of this invention, the total quantity of surfactant fluid is not injected into the formation in a single, large slug as is common practice in surfactant waterflooding operations described in the literature pertaining to surfactant waterflooding. Rather, the surfactant fluid is injected in relatively small slugs, separating the slugs of surfactant fluid by injecting similarly small slugs of aqueous fluid comprising fresh water containing little or no surfactant, said fresh water slugs having salinities no greater than 10,000 and preferably no greater than 1000 parts per million, and having dispersed or dissolved therein an effective amount of a sacrificial agent, preferably a lignosulfonate or modified lignosulfonate as is described hereinafter below.

In applying this process to high salinity formations, where surfactant loss is especially acute and where this process is particulary effective, the particular surfactants will be tailored and if a blend of surfactants is employed, the blend will be balanced so the surfactant is slightly soluble in water having a salinity about equal to the formation water, and additionally so the surfactant reduces the interfacial tension between the formation petroleum and the formation brine to a value less than about 100 and preferably less than about 10 millidynes per centimeter. Once the preferred surfactant species and/or blend is identified, it will be dispersed and/or dissolved in an aqueous fluid having a salinity which is from 50 to 100 and preferably from 80 to 100 percent of the salinity of the formation water.

The salinity of the isolation fluid slugs containing the sacrificial agent which are injected sequentially with the slugs of saline surfactant fluid should be no greater than about 10,000 parts per million total dissolved solids and preferably no greater than 1000 parts per million total dissolved solids, in order to achieve a maximum recapture of surfactant absorbed by the formation matrix and/or contained in stagnant or dead end pores.

The pore volumes of sacrificial agent fluid employed sequentially with the separate slugs of surfactant fluid ordinarily parallel the pore volumes of surfactant fluid used. In one preferred embodiment, the pore volumes of surfactant fluid and pore volume of sacrificial agent fluid injected sequentially therewith will be about equal, although this is not absolutely essential. The pore volume of each sacrificial agent-containing fluid slug should be from 0.5 to 5.0 and preferably from 1.0 to 2.0 times the pore volume of the slug of surfactant fluid injected immediately therebefore.

Similarly, a convenient and preferred method of operating according to the process of this invention comprises injecting slugs of surfactant fluid which are about equal to one another, although this is not necessary, and it may in fact be desirable in certain applications to taper or vary the pore volume of succeeding slugs of surfactant fluid during the course of injecting all of the surfactant fluid into the formation.

The sacrificial agent dissolved or dispersed in fresh water to form the sacrificial agent-containing fluid, is any material exhibiting the following characteristics:

(1) The material should be less expensive than the surfactant with which it will be used.

(2) The material must be partially if not totally adsorbed by the formation matrix, or by some other means, from a buffer to prevent contact between the rock surface and surfactant.

(3) The presence of the sacrificial agent adsorbed by or coating the formation must reduce or eliminate adsorption or other loss of surfactant from aqueous fluid passing through the formation.

(4) The material must not exhibit adverse interaction with surfactants or other materials used in the chemical flood, and must not be precipitated by substances naturally present in formation fluids.

If the formation brine contains only minor amounts of divalent ions, particularly calcium and magnesium, any one or more of a number of inorganic salts may be used. So long as the divalent ion concentration is less than 7,000 and preferably less than 2,000 parts per million, any of the following inorganic salts are effective. Water soluble sodium, potassium, lithium or ammonium salts of carbonate, phosphate, polyphosphate, borate, hydroxide, silicate, fluorides, etc., are effective sacrificial agents.

Certain organic compounds, including pyradine and quaternary ammonium salts including sodium or ammonium salts of tetramethyl ammonium chloride, are also effective sacrificial agents and somewhat more tolerant of divalent ions in formation brine.

Very high concentrations of divalent ions in formation water require the use of slightly different compounds. If the concentration of divalent (or polyvalent) ions succeeds about 7,000 parts per million or more, water soluble sodium, ammonium or other salts of lignosulfonates or modified lignosulfonates, or ethoxylated asphalt, must be employed.

Water soluble lignosulfonate salts are an especially preferred class of sacrificial agent for use in hard brine formations. Any of the commercially available lignosulfonates such as those used for dispersants in drilling fluids and in many are separation processes may be used. Suitable lignosulfonates are available commercially under the following trademarks: MARASPERSE, LIGNOSITE, ORZAN, TORANIL and RAYFLO.

Chemically modified lignosulfonates are also preferred materials for use in this process. For example, chemically oxidized lignosulfonates may be employed for this purpose. The synthesis and performance data of an oxidized lignosulfonate are given in U.S. Pat. No. 4,133,385 and an oxidation method and product are disclosed in U.S. Pat. No. 3,726,850. The disclosure of these two patents insofar as they pertain to methods for producing an oxidatively modified lignosulfonate are incorporated herein by reference.

Carboxylated lignosulfonates are also suitable for use in our process. Carboxylated lignosulfonates can be synthesized by reacting lignosulfonates with chloroacetic acid or by oxidation followed by reaction with chloroacetic acid, or by reaction with carbon dioxide. Reference is made to copending applications Ser. No. 745,505 filed Nov. 26, 1976, abandoned, and Ser. No. 745,495 filed Nov. 26, 1976, abandoned, for further details of the synthesis methods for carboxylated lignosulfonate.

Sulfomethylated lignosulfates may be formed by reacting lignosulfonates with methylene sulfonate. The resulting product is an effective sacrificial agent for use in our process.

Another suitable class of sacrificial agents for use in application of our process to hard brine-containing formations, are ethoxylated asphalts. Ethoxylated asphalts are synthesized by reacting a solution of air-blown asphalt in toluene ethylene oxide. The methods of synthesizing this material are disclosed in U.S. Pat. No. 3,978,928 and the portion thereof disclosing the details of synthesis of this class of materials and the product are incorporated herein by reference.

Alkoxylated asphalt is yet another class of modified asphalts suitable for use in this process. Reference is made to U.S. Pat. No. 4,043,396 for specific disclosure of the process for synthesis of alkoxylated asphalts, and/or description of the product and the portion of the reference describing same is incorporated herein by reference.

The concentration of any of the above-described inorganic salts should be from 0.1 to 10.0 percent by weight. The concentration of lignosulfonate, modified lignosulfone or ethoxylated asphalt should be from 0.10 to 10.0 and preferably from 0.5 to 3.0 percent by weight.

FIELD EXAMPLE

For the purpose of illustrating a preferred mode of operating according to the process of this invention, the following pilot field example is offered. This is not intended to be in any way limitative or restrictive of the scope of this invention, however; rather it is offered only for the purpose of providing a complete disclosure including best modes of operating according to this process.

A subterranean, petroleum-containing formation having a porosity of 25 percent and a permeability of 500 md, has been exploited by primary production and secondary recovery, i.e., conventional waterflooding. At the conclusion of the waterflooding phase, the oil saturation remaining in the formation is about 35 percent and the total amount of oil originally in place in the formation which has been recovered is about 45 percent. The salinity of the water present in the formation at the time waterflooding operations must be terminated is about 100,000 parts per million total dissolved solids including 10,000 parts per million divalent ions, principally calcium plus lesser amounts of magnesium. The temperature is about 180° F. (82° C.). Because of the high salinity, high hardness and high temperature of this formation, the preferred surfactant is sodium nonylbenzenetriethoxypropylene sulfonate. The surfactant is quite effective when used as the only surfactant present in a fluid having a salinity of about 90,000 parts per million total dissolved solids, and the optimum concentration is 1.6 percent by weight (16 kilograms/meter$^3$).

The formation has been exploited by means of a plurality of five-spot patterns, but only one unit is discussed in this pilot example. The producing wells are located at the corners of a square each side of which is 100 feet, with the injection well in the center of the square pattern. The formation thickness is approximately 42 feet and it is known that the volumetric efficiency of this pattern in a fluid displacement process is approximately 70 percent. Accordingly, the pore volume for this pattern which will be affected by injected fluids in the central injection well will be approximately $$100 \times 100 \times 42 \times 0.25 \times 0.7 = 73,500 \text{ cubic feet.}$$

One pore volume is approximately 550,000 gallons. A total of 30 percent pore volume of surfactant, or 165,000 gallons, is employed in this pilot example.

In order to achieve the maximum benefit of the process of this invention, it is decided that the above described quantity of surfactant fluid will be injected into the formation in five approximately equal slugs, each comprising 33,000 gallons of surfactant fluid. Thus the surfactant injection sequence will involve injecting 33,000 gallons of surfactant fluid containing 1.6 percent by weight of the above described surfactant, the salinity of the fluid being about 90,000 parts per million total dissolved solids, followed by injection of about 33,000 gallons of fresh, aqueous fluid containing 1.8 percent by weight of Lignosulfonate 458 ®, a commercially available sodium lignosulfonate. This fluid is prepared in water whose salinity is about 1,000 parts per million total dissolved solids. Another 33,000 gallon slug of surfactant is injected, followed by another 33,000 gallon slug of fresh aqueous, sacrificial agent-containing fluid etc., until the entire 165,000 gallons of surfactant fluid and an equal 165,000 gallons of fresh aqueous, sacrificial agent containing fluid have been injected. After the last slug of the surfactant fluid and last slug of sacrificial agent fluid is injected, a mobility buffer fluid is injected as is commonly practiced in the art. This fluid comprises approximately 200,000 gallons of water whose salinity is about 900 parts per million total dissolved solids, containing about 1100 parts per million of a partially hydrolyzed acrylamide hydrophilic polymer. After the last of the polymer fluid is injected, field brine containing 100,000 parts per million total dissolved solids is injected to displace all of the previously-injected fluids through the formation, with petroleum being recovered from the production wells until the fluid being recovered at those wells rises to a water cut in excess of 99 percent, indicating that all of the oil that can be recovered economically by this tertiary oil recovery process has been recovered from the formation.

EXPERIMENTAL SECTION

For the purpose of further illustrating and disclosing the novel process of this invention, and further to illustrate how the invention can be applied to particular environments and to illustrate the magnitude of results achieved from application thereof, the following described laboratory work was performed and the observed results are described below.

A series of surfactant floods were performed on three Berea formation cores of varying lengths (from 6 inches to 6 feet) using a single surfactant-containing aqueous fluid. In all of the tests, the surfactant employed was a sodium dodecylbenzenepolyethoxyethylene sulfonate containing an average of 4.25 moles of ethylene oxide per mole of surfactant. The concentration of surfactant in all of the tests was 1.5 percent by weight (15 kilograms/meter$^3$). The salinity of the surfactant fluid was approximately 90,000 parts per million (90 kilograms/meter$^3$) total dissolved solids. These tests were conducted in connection with a study of a possible process for surfactant flooding in a formation containing water whose salinity was in the range of from 85,000 to 100,000 parts per million (85 to 100 kilograms/meter$^3$) total dissolved solids.

In all of the laboratory experiments described below, the cores were mounted in conventional laboratory flooding equipment, saturated with brine, then oil saturated, and next waterflooded to an oil saturation value appoximating that existing at the conclusion of waterflooding in an oil formation. The surfactant fluid was then injected into the cores, followed by injecting a mobility-controlling fluid comprising 1000 parts per million of a polysaccharide in water, and displaced by field brine having a salinity in the range of 85 to 100,000 parts per million total dissolved solids, until the water cut of the fluid being recovered from the core had risen to a value signifying completion of the test.

In each of the first series of experiments, a single 0.33 pore volume slug of the above described saline surfactant-containing aqueous fluid was injected into the core as described above, followed by 0.33 pore volume slug of polymer solution, and completed by injecting brine. The three tests were conducted in cores whose lengths were 6 inches, 1 foot and 6 feet. The tertiary oil recovery in the short, 6-inch core was in the range of about 59 percent of the oil in place in the core, but decreased to about 54 percent in the 1-foot core and to about 42 percent in the 6-foot core. This clearly indicates that the surfactant fluid is effective for displacing oil from the pore channels of the formation in significant quantities above that obtainable by waterflooding, but also shows the severity of the problem associated with loss of surfactant from the aqueous surfactant fluid to the formation material of which the core is composed. The rate of decline of tertiary oil recovery with increasing distance between injection and production point suggests that the process will be ineffective for recovering significant amounts of oil in application to formations in which the distance between the injection point and production point is significantly greater than the length of the longer core employed in these tests. For example, if the oil recovery vs. distance between injector and producer can validly be extrapolated, oil recovery using this single slug process will decrease to about 22 percent if the injector producer distance is about 100 feet. This is clearly unsatisfactory and would not result in an economically viable surfactant waterflooding oil recovery process.

Another series of experiments were conducted in essentially the same manner as that described above, using Berea cores and a similar surfactant-containing fluid. Two runs (A and B) were conducted according to this invention by injecting small slugs of surfactant. Each surfactant slug was followed by a slug of fluid comprising fresh water (of no more than 100 parts per million total dissolved solids salinity) having dissolved therein 1.5 percent by weight Lignosulfonate 458 ®, a commercially available lignosulfonate. The exact sequence of slugs injected was as follows:

(1) 0.11 pore volume surfactant fluid;
(2) 0.22 pore volume fresh water containing lignosulfonate;
(3) 0.11 pore volume surfactant fluid;
(4) 0.11 pore volume of fresh water plus lignosulfonate;
(5) 0.11 pore volume of surfactant fluid;
(6) 0.33 pore volume of fresh water containing 1000 ppm Xanflood ® polymer;
(7) 1.8 pore volumes of brine.

A base flood (Run C) employing the same total volume of the same surfactant fluid, injected in a single slug, followed by polymer and brine, was run for comparative purposes. The results are given in Table I below.

TABLE I

| Flood No. | Core Length (ft) | $E_r$ (Oil Recovery) |
|---|---|---|
| A | 0.48 | 51.1 |

TABLE I-continued

| Flood No. | Core Length (ft) | $E_r$ (Oil Recovery) |
|---|---|---|
| B | 0.48 | 49.3 |
| C(base) | 0.50 | 42.0 |

The core diameter was 2 inches and the permeability was 70–200 md. The porosity was 21–23 percent. The surfactant fluid contained 1.5 percent (15 kg/m$^3$) dodecylbenzenetetraethoxyethylene sulfonate in fluid containing 85,000 ppm salinity. The total volume of surfactant fluid used was 0.33 pore volumes, divided into three separate, approximately equal slugs. Two slugs of fluid comprising fresh water and sacrificial agent were injected each being about 0.22 and 0.11 pore volumes respectively.

The base run (Run C) comprised the same total pore volume of the same surfactant, but injected as a single slug according to the prior art teachings. All of the runs were concluded by injecting an aqueous fluid containing Xanflood ®, polysaccharide, and followed by brine to at least 99.0 percent water cut.

It can be seen that the runs employing the process of our invention recovered significantly more oil than the run conducted according to the prior art in otherwise identical runs.

We have found that if a single, large slug of surfactant and polymer are followed by a single, large slug of fresh water equivalent in volume to the plurality of small slugs of fresh water, an increase in tertiary oil recovery is noted. The magnitude of the increase is less than that observed using plurality of slugs according to our invention, however. Also, the final oil recovery (at maximum water cut) is only achieved after injecting greater total quantities of liquid, which means the economic end of an enhanced oil recovery process will come at a much later time using a single terminal fresh water slug than in applying our invention. In a commercial field application, the difference in time to reach the economic cut-off point may be in the range of several years, which makes our process much more economical than one employing a single slug of fresh water. It must also be understood that if the surfactant fluid and fresh water are mixed on the surface and injected as a large, single slug, the oil recovery effectiveness will be greatly reduced, since the fluid salinity and surfactant concentration would both be reduced below the optimum level.

While the foregoing disclosure of the process of this invention has been described in a number of specific illustrative embodiments, this is not in any way limitative or restrictive of the true scope of this invention. Furthermore, while explanations have been offered for the improvements observed in applying this process, it is not necessarily represented that these are the only or even the primary mechanisms responsible for the improvements achieved. It is our intention that our invention be limited and restricted only by those limitations and restrictions appearing in the claims appended immediately hereinafter below.

We claim:

1. A method of recovering petroleum from a subterranean, petroleum-containing, permeable formation penetrated by at least one injection well and by at least one production well, said formation containing water having a salinity in excess of about 20,000 parts per million total dissolved solids, including known or determinable divalent ion concentration, comprising injecting into the formation a predetermined volume of an aqueous saline surfactant fluid, said surfactant being slightly soluble in a fluid having a salinity of from 50 to 100 percent of the salinity of the water present in the formation, and reducing interfacial tension between the petroleum and water to a value less than 100 millidynes/centimeter, said surfactant fluid being injected by the injection well and displacing petroleum in the formation toward the production from which it is recovered to the surface of the earth, wherein the improvement comprises:

injecting the surfactant fluid into the formation in from 2 to 15 separate slugs, and separating successive slugs of surfactant fluid from one another by injecting sequentially therewith, separate isolation slugs of fluid consisting of fresh water having salinity less than 10,000 parts per million total dissolved solids, and having dissolved therein from 0.1 to 10.0 percent by weight of a sacrificial agent.

2. A method as recited in claim 1 wherein the number of surfactant slugs is from 3 to 6.

3. A method as recited in claim 1 wherein the volume of each surfactant slug is at least 5 percent of the total volume of surfactant fluid.

4. A method as recited in claim 3 wherein the volume of each surfactant slug is at least 10 percent of the total volume of surfactant fluid.

5. A method as recited in claim 1 wherein the salinity of the isolation slugs is less than 1000 parts per million total dissolved solids.

6. A method as recited in claim 1 wherein the volume of each isolation slug is from 0.5 to 5.0 times the volume of the preceeding surfactant slug.

7. A method as recited in claim 6 wherein the volume of each isolation slug is from 1.0 to 2.0 times the volume of the preceeding surfactant slug.

8. A method as recited in claim 1 wherein the formation water contains less than 7,000 parts per million divalent ions, and the sacrificial agent is an inorganic salt selected from the group consisting of water soluble sodium, potassium, lithium or ammonium salts of carbonate, phosphate, polyphosphate, borate, hydroxide, silicate, fluorides, and mixtures thereof.

9. A method as recited in claim 1 wherein the divalent ion concentration of the formation water is greater than 7,000 parts per million, and the sacrifical agent is a water soluble lignosulfonate, a modified lignosulfonate, an alkoxylated asphalt, or a mixture thereof.

10. A method as recited in claim 9 wherein the alkoxylated asphalt is an ethoxylated asphalt.

11. A method as recited in claim 9 wherein the modified lignosulfonate is an oxidized lignosulfonate.

12. A method as recited in claim 9 wherein the modified lignosulfonate is a carboxylated lignosulfonate.

13. A method as recited in claim 9 wherein the modified lignosulfonate is a sulfomethylated lignosulfonate.

14. A method as recited in claim 1, wherein the isolation slugs comprise sacrificial agent dissolved in fresh water which contains little or no surfactant.

15. A method as recited in claim 14, wherein the isolation slugs comprise sacrificial agents dissolved in fresh water which contain no surfactant.

16. A method as recited in claim 1, wherein the isolation slugs consist of sacrificial agent dissolved in fresh water having salinity less than 1,000 parts per million total dissolved solids.

17. A method of recovering petroleum from a subterranean, petroleum-containing, permeable formation penetrated by at least one injection well and be at least one production well, each well being in fluid communication with at least a portion of the formation, said formation containing water of known or determinable salinity in the range of from 20,000 to 240,000 parts per million total dissolved solids, including known or determinable concentrations of divalent ions comprising (a) injecting from 0.01 to 0.50 pore volumes of an aqueous saline, surfactant-containing fluid into the formation via the injection well, said fluid containing from 0.1 to 10.0 percent by weight of a surfactant which is slightly soluble in said fluid and which reduces the interfacial tension between formation petroleum and said fluid to a value less than 100 millidynes per centimeter, (b) injecting from 0.01 to 1.00 pore volumes of an isolation slug consisting of fresh water having a salinity which is no greater than 10,000 parts per million total dissolved solids and having dissolved therein from 0.1 to 10 percent of a sacrificial agent, into the formation to displace the surfactant fluid away from the injection well;

(c) repeating steps (a) and (b) at least once;

(d) recovering petroleum displaced by the previously injected fluids from the formation via the production well.

18. A method as recited in claim 17 wherein the volume of surfactant fluid is from 0.05 to 0.20 pore volumes.

19. A method as recited in claim 17 wherein the volume of the isolation slug is from 0.05 to 0.50 pore volumes.

20. A method as recited in claim 17 wherein the number of slugs of surfactant fluid is from 2 to 15.

21. A method as recited in claim 17 wherein the number of slugs of surfactant fluid is from 3 to 6.

22. A method as recited in claim 17 wherein the salinity of the isolation slug is no more than 1,000 parts per million total dissolved solids.

23. A method as recited in claim 17 wherein the total concentration of surfactant in the surfactant-containing fluid is from 0.5 to 3.0 percent by weight.

24. A method as recited in claim 17 wherein the formation water contains less than 7,000 parts per million divalent ions, and the sacrificial agent is an inorganic salt selected from the group consisting of water soluble sodium, potassium, lithium or ammonium salts of carbonate, phosphate, polyphosphate, borate, hydroxide, silicate, fluorides, etc.

25. A method as recited in claim 17 wherein the divalent ion concentration of the formation water is greater than 7,000 parts per million, and the sacrificial agent is a water soluble lignosulfonate, a modified lignosulfonate, an alkoxylated asphalt or a mixture thereof.

26. A method as recited in claim 25 wherein the alkoxylated asphalt is an ethoxylated asphalt.

27. A method as recited in claim 25 wherein the modified lignosulfonate is an oxidized lignosulfonate.

28. A method as recited in claim 25 wherein the modified lignosulfonate is a carboxylated lignosulfonate.

29. A method as recited in claim 25 wherein the modified lignosulfonate is a sulfomethylated lignosulfonate.

30. A method as recited in claim 17 wherein steps (a) and (b) are repeated at least three times.

31. A method as reicted in claim 17, wherein the isolation slugs comprise sacrificial agent dissolved in water having salinity no greater than 10,000 parts per million total dissolved solids and contains little or no surfactant.

32. A method as recited in claim 31, wherein the isolation slugs contain no surfactant.

33. A method as recited in claim 17, wherein the isolation slugs consist of sacrificial agent dissolved in fresh water having salinity less than 1,000 parts per million total dissolved solids.

* * * * *